United States Patent [19]

Homier

[11] Patent Number: 5,588,700
[45] Date of Patent: Dec. 31, 1996

[54] CHILD SAFETY SEAT WITH SIDE BOLSTERS

[75] Inventor: Robert I. Homier, Plymouth, Mich.

[73] Assignee: Douglas & Lomason Company, Farmington Hills, Mich.

[21] Appl. No.: 202,998

[22] Filed: Feb. 28, 1994

[51] Int. Cl.$^6$ .................................................. B60N 2/30
[52] U.S. Cl. .............................. 297/238; 297/334; 297/14
[58] Field of Search ............................ 297/238, 14, 334, 297/335, 331

[56] References Cited

U.S. PATENT DOCUMENTS

| | | | |
|---|---|---|---|
| 1,761,673 | 6/1930 | Laursen | 297/14 |
| 1,887,240 | 11/1932 | Hanson | 297/331 |
| 1,965,048 | 6/1934 | Morris . | |
| 2,337,480 | 12/1943 | Logan | 297/238 X |
| 2,436,294 | 2/1948 | Glatstein . | |
| 2,584,481 | 2/1952 | Mast et al. . | |
| 2,966,201 | 12/1960 | Strahler . | |
| 3,093,414 | 6/1963 | Eames et al. | 297/14 X |
| 3,094,354 | 6/1963 | Bernier . | |

(List continued on next page.)

FOREIGN PATENT DOCUMENTS

| | | |
|---|---|---|
| 6699290 | 12/1989 | Australia . |
| 0258194 | 8/1986 | European Pat. Off. . |
| 0286542 | 4/1987 | European Pat. Off. . |
| 0324503 | 1/1988 | European Pat. Off. . |
| 0348374 | 6/1988 | European Pat. Off. . |
| 2307673 | 4/1975 | France . |
| 2624805 | 12/1987 | France . |
| 2454573 | 5/1975 | Germany . |
| 7612141 | 4/1976 | Germany . |
| 2720954 | 12/1977 | Germany . |
| 7916857 | 6/1979 | Germany . |
| 2807064 | 8/1979 | Germany . |
| 2823529 | 12/1979 | Germany . |
| 2825329 | 12/1979 | Germany . |
| 3020212 | 12/1981 | Germany . |
| 3215488 | 11/1983 | Germany . |
| 3716038 | 12/1987 | Germany . |
| 3631726 | 3/1988 | Germany . |
| 59-156836 | 6/1984 | Japan . |
| 2023415 | 6/1978 | United Kingdom . |
| 2122886 | 1/1984 | United Kingdom . |
| 2167949 | 12/1984 | United Kingdom . |
| 2209666 | 5/1989 | United Kingdom . |

OTHER PUBLICATIONS

"The Integrated Child Seat: Elements of Design" (920494), 1992, J. Lambert, Atoma International, Inc., pp. 1–12.
Accessories Bulletin—Volvo Parts Division, Apr. 1991, "940 Sedan Child Safety Cushion", No. 2.
Accessories Bulletin—Volvo Parts Division, Sep. 1990, "Child Cushion & Backrest", No. 1.
Electrolux Autoliv—1990—"Expanding Integrated Child Booster Cushion", pp. 1–4.
Volvo 850 GLT brochure, Apr. 1991, p. 41.

*Primary Examiner*—Peter M. Cuomo
*Assistant Examiner*—David E. Allred
*Attorney, Agent, or Firm*—Harness, Dickey & Pierce, P.L.C.

[57] ABSTRACT

A "fold-out" or integral child restraint seat having a mechanism interconnecting a seatback member and a seat member for causing coordinated movement therebetween. When it is desired to deploy the integral child seat, the seatback member is automatically moved to its reclined operative position in coordination with movement of the seat member to its lowered operative position. Conversely, when it is desired to stow the integral child seat, the seatback member is automatically moved to its upright storage position in coordination with movement of the seat member to its raised storage position. As a result, movement of the integral child seat between its stowed and deployed positions can be accomplished in one operation for substantially enhancing the convenience afforded to the person attempting such movement. The integral child seat also provides lateral side bolsters formed on each of the seatback member and seat member that are alignable in the deployed position to establish substantially continuous lateral supports along the entire length of the child seat.

9 Claims, 3 Drawing Sheets

U.S. PATENT DOCUMENTS

| | | |
|---|---|---|
| 3,594,037 | 7/1971 | Sherman ............................ 297/14 |
| 4,230,366 | 10/1980 | Ruda . |
| 4,533,176 | 8/1985 | Wyttenbach . |
| 4,540,216 | 9/1985 | Hassel, Sr. . |
| 4,541,654 | 9/1985 | Jonasson . |
| 4,555,135 | 11/1985 | Freeland . |
| 4,596,420 | 6/1986 | Vaidya . |
| 4,655,503 | 4/1987 | Kamijo et al. . |
| 4,664,443 | 5/1987 | Casale . |
| 4,690,449 | 9/1987 | Holman . |
| 4,690,455 | 9/1987 | Bailey et al. . |
| 4,722,568 | 2/1988 | Irvin . |
| 4,756,573 | 7/1988 | Simin et al. . |
| 4,768,827 | 9/1988 | Musgrove ............................ 297/236 |
| 4,900,086 | 2/1990 | Steward . |
| 4,900,087 | 2/1990 | Crisp . |
| 4,902,069 | 2/1990 | Lehnert ............................ 297/14 |
| 4,902,070 | 2/1990 | Casale et al. . |
| 4,913,498 | 4/1990 | Forlivo . |
| 4,936,627 | 6/1990 | Guim ............................ 297/238 |
| 4,936,631 | 6/1990 | Mochida et al. . |
| 4,943,112 | 7/1990 | Law . |
| 4,986,600 | 1/1991 | Leblanc et al. . |
| 5,026,118 | 6/1991 | Vander Stel et al. ............................ 297/238 |
| 5,100,199 | 3/1992 | Vander Stel et al. . |
| 5,106,158 | 4/1992 | Dukatz et al. . |
| 5,135,285 | 8/1992 | Dukatz et al. . |
| 5,161,855 | 11/1992 | Harmon . |
| 5,282,668 | 2/1994 | Heussner et al. ............................ 297/14 X |
| 5,429,414 | 7/1995 | Olsson et al. ............................ 297/238 |

CHILD SAFETY SEAT WITH SIDE BOLSTERS

BACKGROUND OF THE INVENTION

The present invention relates generally to child restraint seats and, more particularly, to a fold-out child seat of the type integrated into the backrest of a vehicular seating arrangement and having means for causing coordinated movement of a seatback member and a seat member between stowed and deployed positions. In addition, the seatback member and the seat member each include integral side bolsters for providing improved lateral support of the child seat occupant.

Virtually all motor vehicles are equipped with safety belt restraint systems for physically restraining the seat occupant when the vehicle is subjected to a high rate of deceleration which may occur, for example, during a motor vehicle collision. While conventional safety belt restraint systems are well-suited for restraining adult passengers, it is a common practice to use a portable (i.e., "add-on") child seat having a belt-type harness for children under a given age and weight. For instance, most portable child seats are rated for children weighing up to forty pounds and are generally recommended for use with children under the age of four years. As is known, such portable child seats are placed on top of the vehicle seat and secured thereto using the existing vehicular safety belt restraint system.

In an effort to minimize the inconvenience associated with installing and/or stowing portable child seats, some motor vehicles are now available with seating arrangements that have one or more "fold-out" child seats built-in or integrated into the backrest of an otherwise conventional seat. When needed, the integral child seat can be "deployed" by rotating a seat member to a lowered position for exposing a retractable belt-type harness for restraining a child seated within the child seat. Following use, the integral child seat can be "stowed" by rotating the seat member to a raised position concealed within the backrest. Once stowed, the seating arrangement accommodates an adult in a normal seated position while preserving the overall cosmetic appearance and comfort of the vehicle seat. Typically, a manually-operable latching mechanism is also provided for releasably locking the integral child seat in the stowed position. Alternatively, some integral child seats, especially those associated with bench-type seats, also include a headrest member that can be moved between a lowered stowed position and an elevated deployed position. In such applications, the latching mechanism is usually operable for releasably locking both of the headrest member and the seat member in their respective stowed and deployed positions.

As will be appreciated, motor vehicles equipped with seats having one or more fold-out type integral child seats are extremely popular in view of the enhanced convenience they provide. However, since integral child seats are typically integrated into otherwise conventional seats, various regulatory standards have been promulgated which set forth specific design criteria as well as performance and testing requirements. To comply with these standards, it is again common for the vehicle manufacturers to establish limitations on the size and weight of children using the integral child seat. Regardless of such limitations, the regulatory standards establish specific design and structural requirements that must be met. For instance, all integral child seats must meet pre-established minimum cross-sectional surface area requirements for the seatback and its lateral side support. In this light, it is recognized that belt-type harness restraints assist in providing lateral or "side-to-side" support of a child strapped into the integral child seat. Most commonly, conventional belt-type harnesses are classified as either a 3-point restraint or a 5-point restraint based on the number of anchor/loading points associated therewith. While 3-point harness restraints are considered more convenient to use and are generally satisfactory for their intended purpose, it has been proven that 5-point harness restraints provide greater lateral support for minimizing excessive side-to-side rolling movement of the occupant within the child seat. Unfortunately, 5-point harness restraints are not always used and/or adjusted properly which can detrimentally impact their overall restraining capabilities.

In an effort to provide enhanced lateral restraint, it has been proposed to incorporate enlarged side bolsters into at least one of the seatback and seat of the integral child seat. The most relevant prior art known to the present invention is disclosed in U.S. Pat. No. 4,902,070 to Casale et al. which illustrates a fold-out integral child seat comprised of an upper backrest portion having a pair of integral headrest segments and a lower backrest portion having a pair of integral armrest segments. As designed, the upper backrest portion folds down over, and is latched to, the lower backrest portion such that the entire unit can then be rotated about a single pivot to a concealed position with the backrest of the vehicle seat for storage in a reduced trunk area. Unfortunately, this arrangement is extremely complex in construction, expensive to manufacture and is rather limited in function and application. More particularly, due to the interleaved folding requirements, the lateral spacing between the armrest segments is relatively narrow which significantly limits the available space for children using the integral child seat. Additionally, no lateral support for the shoulders and upper torso of the child appears to be provided between the headrest and armrest segments. Finally, since it is not uncommon for a person to be burdened with the job of releasing and deploying the child seat from its stowed position while holding the child in one arm, the multi-step process for deploying this integral child seat is generally considered to be awkward and cumbersome.

Thus, in view of the above, a need exists to develop a fold-out type integral child seat which overcomes the shortcomings of the prior art and yet which can be readily adapted for use in various vehicular seating applications.

SUMMARY OF THE INVENTION

Accordingly, the present invention is directed to meeting the above object by providing a "fold-out" or integral child seat having means interconnecting the seatback and the seat for causing coordinated movement therebetween. Thus, when it is desired to deploy the integral child seat, the seatback is automatically moved to a reclined position in coordination with movement of the seat to its lowered deployed position. Conversely, when it is desired to stow the integral child seat within the backrest, the seatback is automatically moved to a generally upright position in coordination with movement of the seat to its raised storage position. As a result, movement of the integral child seat between its stowed and deployed positions can be accomplished in one operation for substantially enhancing the convenience afforded to the person attempting such movement.

A further object of the present invention is to provide an integral child seat wherein each of the upholstered seat and the seatback include a pair of laterally-spaced side bolster segments. To this end, the seat includes a rigid seat pan and the seatback includes a rigid back support panel that are each formed to include integral side bolster segments. More particularly, the seat pan includes a first pair of lateral bolsters for inhibiting side-to-side movement of the lower body portion of an infant strapped in the integral child seat. Similarly, the back support panel includes a second pair of lateral bolsters for supporting the upper torso body portion of the infant against excessive side-to-side movement. Once deployed, the first and second pairs of bolsters are aligned within common planes to define a generally continuous pair of lateral side supports which extend substantially along the entire length of the integral child seat.

Yet another object of the present invention involves the use of a 3-point belt-type harness restraint in association with the bolstered fold-out child seat to facilitate enhanced comfort for the occupant and convenience for the user.

Another object is to provide a modular child seat assembly that is adapted for use in vehicular rear seating applications wherein a trunk space or storage area is located behind the vehicle seat. The pre-assembled child seat module can be mounted to the existing or modified vehicle chassis and/or seat frame structure to meet required load-carrying standards.

Additional objects, advantages, and features of the present invention will become apparent to those skilled in the art from studying the following written description and appended claims, taken in conjunction with the accompanying drawings.

DETAILED DESCRIPTION OF THE INVENTION

The present invention is generally directed to an improved construction for a child restraint seat which can be built-in or integrated into a passenger seating arrangement. More particularly, a preferred embodiment of a "fold-out" or integral child restraint seat is disclosed that is well-suited for use in motor vehicle rear seat applications and which offers improved convenience and operational advantages over conventional integral child seats. Thus, it is to be understood that while the preferred embodiment of the present invention is hereinafter disclosed in association with one particular vehicular seating arrangement, the disclosed seating arrangement is merely an exemplary representation of but one type of environment to which the present invention is readily applicable.

Figure 1:
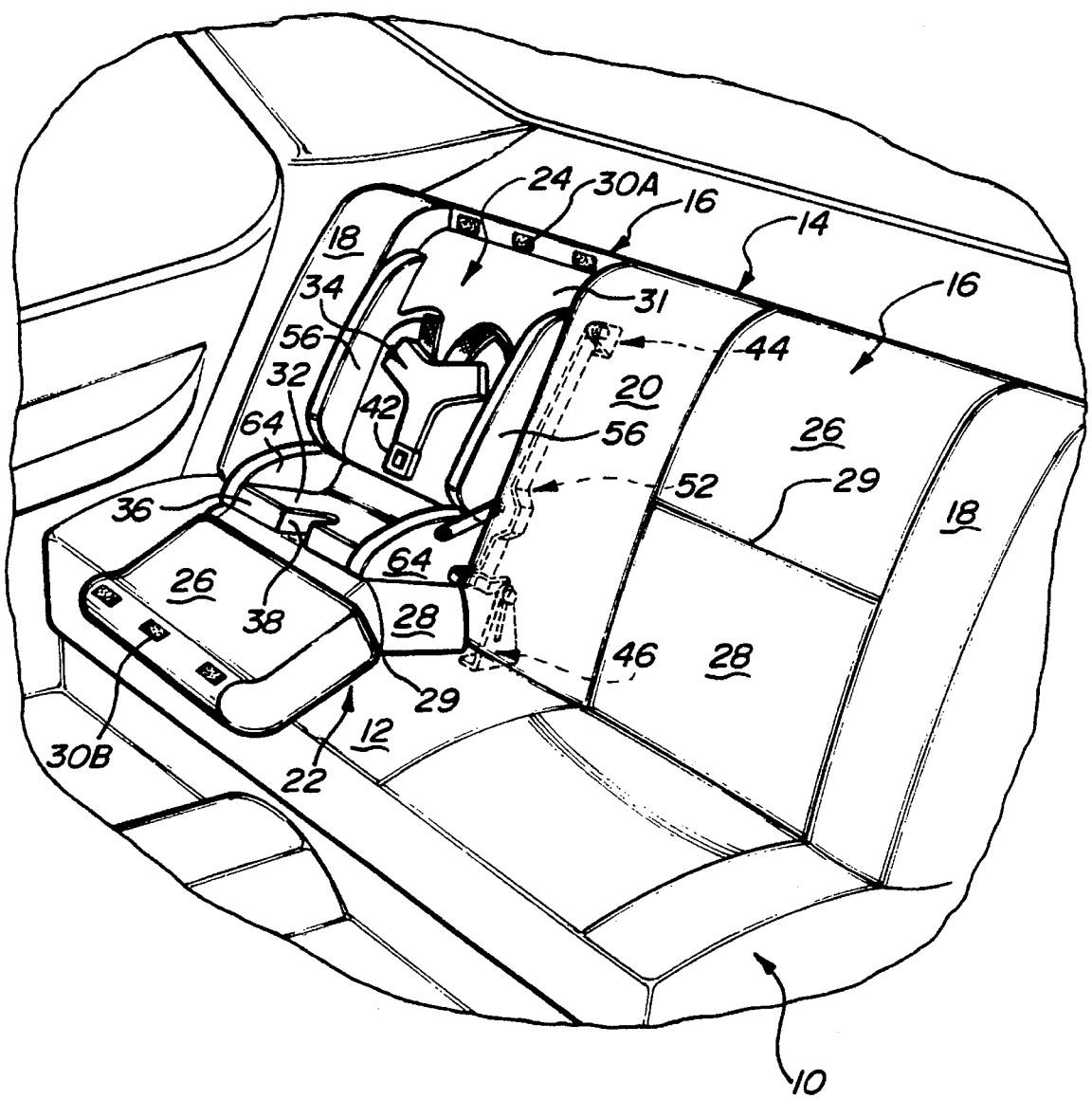
FIG. 1 is a perspective view of an exemplary rear passenger compartment showing a rear seat having a pair of integral child seats which incorporate the novel principles of the present invention and which further shows one of the integral child seats in a "stowed" position and the other integral child seat in a "deployed" position.

Referring now to the drawings, and particularly to FIG. 1, an exemplary rear seat 10 of the type used in motor vehicles is shown. Moreover, rear seat 10 is of the type typically installed adjacent to and forward of a cargo or trunk storage compartment. In general, rear seat 10 includes a seat cushion 12, a backrest 14, and a pair of "fold-out" or integral child restraint seats 16 incorporated into recesses formed in backrest 14 between end cushions 18 and a central cushion 20. Those skilled in this art will understand that rear seat 10 may likewise be equipped with only one integral child seat if so required for the particular seating application.

Each integral child seat 16 includes an upholstered seat assembly 22 and an upholstered seatback 24. As shown, one side of rear seat 10 is in a normal adult seating position with its integral child seat 16 retracted into a "stowed" position. In this position, upper and lower cushions 26 and 28, respectively, of seat assembly 22 are flush with adjacent edges of its corresponding end cushion 18 and central cushion 20 to define a continuous backrest surface such that integral child seat 16 is completely concealed. Thus, rear seat 10 has the cosmetic appearance and function of an otherwise conventional vehicular seat which can be used in the usual manner with a seat occupant restrained by an existing vehicular safety belt restraint system (not shown). Upper cushion 26 is pliably connected to lower cushion 28 in any suitable manner, such as by a flexible continuous hinged seam or piping 29. Furthermore, upper cushion 26 of seat assembly 22 and backrest 14 each include fastening means, such as VELCRO hook and loop fasteners 30A and 30B, for releasably securing the distal edge of upper cushion 26 to an upper edge of backrest 14 when integral child seat 16 is in the stowed position. However, it will be appreciated that any suitable fastener or latching mechanism can be used for releasably securing seat assembly 22 in its stowed position.

With continued reference to FIG. 1, the integral child seat 16 associated with the opposite side of rear seat 10 is shown extended to a "deployed" position. Once deployed, a cushioned back pad 31, a cushioned seat pad 32 and a safety belt restraint system, shown as a 3-point belt-type harness restraint 34, are exposed. Typically, back pad 31 is removably attached to upholstered seatback 24 and seat pad 32 is removably attached to an upholstered bolster seat 36 associated with seat assembly 22 to facilitate easy cleaning. As shown, bolster seat 36 is mounted to and carries lower cushion 28. The formed pad covering bolster seat 36 is shaped to include a center recess 38 within which a tongue plate 40 (FIG. 3) is located for releasable latched engagement with a buckle 42 of harness restraint 34. As will be detailed hereinafter, each integral child seat 16 also include means interconnecting bolster seat 36 of seat assembly 22 to seatback 24 for causing concurrent and proportional movement therebetween. Thus, movement of integral child seats 16 between the "stowed" and "deployed" positions can be accomplished with one continuous motion.

Figure 2:
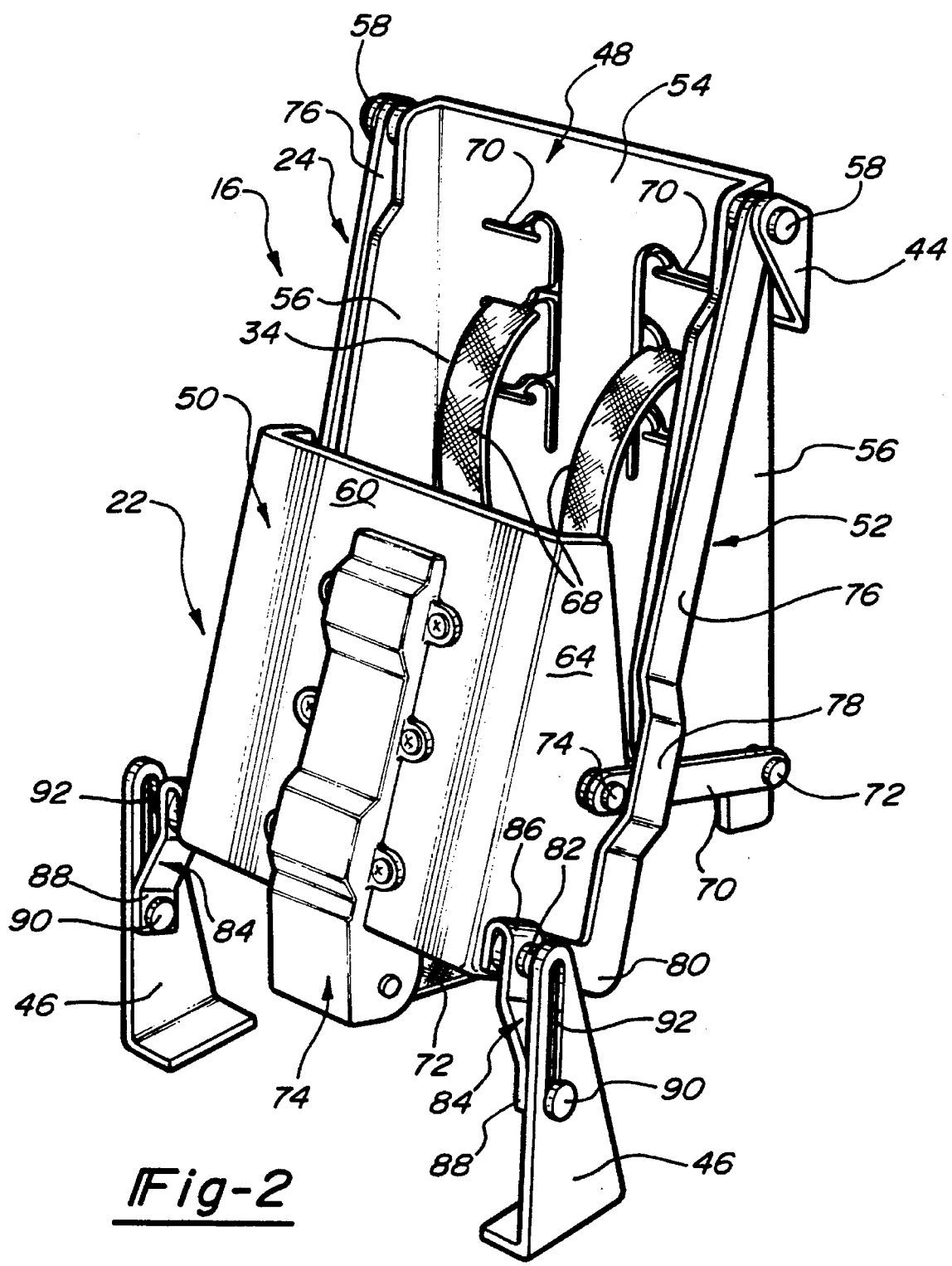
FIG. 2 is a perspective view of one of the integral child seats, with its upholstery and padding removed for clarity, showing the underlying structural components associated therewith retracted to a "stowed" position.
Figure 3:
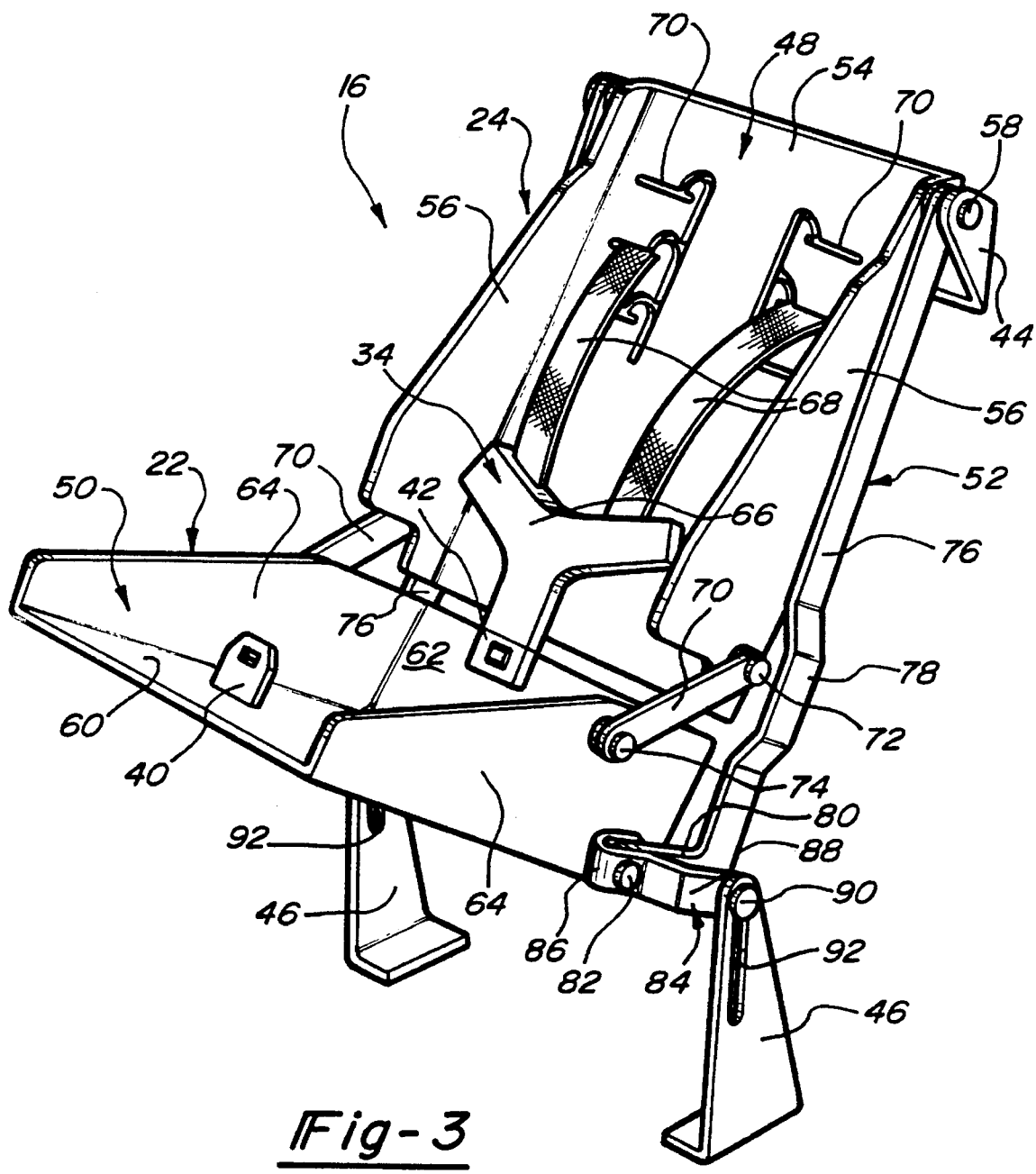
FIG. 3 is a perspective view, similar to FIG. 2, showing the underlying structural components for the integral child seats extended to a "deployed" position.

With particular reference now to FIGS. 2 and 3, one of integral child seats 16 is shown with its upholstery and padding removed to more clearly illustrate the novel structural and operational features of the present invention. In general, integral child seat 16 is a modular assembly having a pair of upper and lower mounting brackets 44 and 46, respectively, that are providing for securing the modular child seat assembly to a frame structure (not shown) of rear seat 10, or in the alternative, to portions of the frame structure or chassis of the motor vehicle itself. It will be appreciated that modifications, reinforcements and/or additions might possibly be made to the underlying frame structure for purposes of providing adequate load-carrying of the modular child seat assembly. Depending on the particular seating application, integral child seat 16 can be stowed within backrest 14 or, in the alternative, within a portion of the trunk area located rearward of backrest 14.

The basic underlying structure of integral child seat 16 includes a back support 48, a seat pan 50, and movement coordinating means 52 interconnecting seat pan 50 to back support 48 for coordinating the concurrent and proportional movement of seat assembly 22 and seatback 24 between positions establishing their respective "stowed" and "deployed" positions. In operation, movement coordinating means 52 is adapted to cause pivotable reclining movement of back support 48 relative to backrest 14 between a rearward, generally "upright" position when integral child seat 16 is stowed and a forward "reclined" position when integral child seat 16 is deployed. Thus, such reclining movement allows integral child seat 16 to be articulated from its "stowed" position within a recessed cavity of backrest 14 to its "deployed" position for providing greater seated comfort to the child. In addition, movement coordinating means 52 is adapted to positively locate and support integral child seat 16 in the deployed position such that lower cushion 28 of seat assembly 22 is not required to rest on seat cushion 12 to support bolster seat 36, thereby maintaining a desired angular relationship between seat pan 50 and back support 48 in the deployed position. Movement coordinating means 52 is also adapted to maintain the angulated (i.e., "reclined") relationship of bolster seat 36 and seatback 24 relative to rear seat 10 when integral child seat 16 is deployed as well as for enhancing the stability of coordinated movement therebetween while concurrently inhibiting premature movement of the components toward the stowed position once integral child seat 16 has been completely deployed.

With continued reference to FIGS. 2 and 3, back support 48 is shown as a rigid panel having a back segment 54 and a pair of integral side bolster segments 56 formed to extend transversely and outwardly relative to back segment 54. Back support 48 can be fabricated from any material providing the requisite strength and rigidity, with a molded plastic material being the preferred material of choice. As seen, side bolsters 56 extend along substantially the entire length of back segment 54 and are generally tapered so as to increase in an outwardly directed dimension from top to bottom. The tapered profile is designed to provide enhanced lateral support for the shoulders, arms and upper torso body portions (i.e., above the waist) of a child seated in integral child seat 16 for inhibiting excessive lateral ("side-to-side") excursion of the child during impact situations. However, the tapered profile is not intended to be limiting in nature and may be modified for particular seating applications. As seen, back support 48 is supported for pivotable movement relative to backrest 14 of rear seat 10. In particular, a pair of upper seatback pivots are established by hinge pins 58 that couple an uppermost portion of each side bolster 56 to each upper mounting bracket 44 for permitting pivotable movement of back support 48 relative thereto.

Seat pan 50 is shown as an open-ended frame member having a seat segment 60, a lower back segment 62 extending upwardly and transversely to seat segment 60 along a back edge thereof, and a pair of hip bolster segments 64 extending upwardly and transversely to seat segment 60 along the lateral sides thereof. Hip bolsters 64 are forwardly tapered in decreasing height from a maximum height at a rearward portion of seat pan 50 to a minimum height at the forward open end of seat pan 50. The height and tapered profiles are again selected to provide enhanced lateral support for the waist, hips and upper leg portions of a child occupant while still permitting compact folding of seat pan 50 relative to back support 48. As seen from FIG. 3, upon deployment of integral child seat 16, lower back segment 62 of seat pan 50 is generally aligned in a common plane with back segment 54 of back support 48. Likewise, side bolsters 56 of back support 48 are each generally aligned in a common plane with hip bolsters 64 of seat pan 50. In the upholstered version shown in FIG. 1, this coplanar alignment establishes a substantial continuous rear seatback surface as well as a pair of substantially continuous side bolsters which extend along substantially the entire lateral edges of integral child seat 16.

Harness restraint 34 is shown to include an enlarged T-bar shield 66 to which the first end of a pair of shoulder belts 68 are coupled. Shoulder belts 68 pass through one of a series of longitudinal aligned adjustment slots 70 formed in back segment 54 of back support 48. The opposite end of each shoulder belt 68 is typically coupled to a unitary extension belt 71 that is shown to extend from a linear-type belt retractor 72. Linear retractor 72 is mounted to an underside surface of seat pan 50 so as to be enclosed within lower cushion 28. However, it is contemplated that any suitable type of retractor (linear, rotary, etc.) may be mounted to either the underside of seat pan 50 or the rear surface of back support 48 as long as it is operable for permitting withdrawal and retraction of shield 66 and shoulder belts 68 relative to slots 70. Preferably, retractor 72 is of the automatic locking type so as to permit retraction and withdrawal of harness restraint 34 until buckle 42 is latched to tongue plate 42, whereby subsequent withdrawal is thereafter prevented. Thus, while use of a 3-point harness restraint is disclosed, it will be understood that the present invention can be used with virtually any conventional harness or belt restraint system meeting the regulatory standards.

To provide means for causing back support 48 to pivot about upper seatback pivots 58 between upright and reclined positions in response to movement of seat pan 50 between raised and lowered positions, movement coordinating means 52 includes a pair of pull links 73 pivotally coupling a bottom portion of side bolsters 56 to an upper portion of hip bolsters 64. More specifically, a first end of each pull link 73 is pivotably coupled to the bottom portion of each side bolster 56, as indicated at a lower seatback pivot 74. Likewise, a second end of each pull link 73 is pivotably coupled to the upper rear portion of each hip bolsters 64, as indicated at an upper seat pivot 75. Movement coordinating means 52 further includes a pair of elongated guide links 76 each having its upper end pivotably coupled to an upper mounting bracket 44 at upper seatback pivot 58 and the distal end of its lower cranked segment 80 pivotably coupled to a lower seat pivot 82. An intermediate segment 78 of each guide link 76 is outwardly offset so as to provide a clearance relative to each pull link 73 for permitting articulated pivotable movement of seat pan 50 and back support 48.

Movement coordinating means 52 also includes a pair of drive links 84 pivotally coupling a lower portion of hip bolsters 64 to lower mounting brackets 46. More particularly, a first end of each drive link 84 is rolled to provide parallel flanges that surround the distal end of cranked segment 80 of each guide link 76 and which is pivotably coupled with respect thereto and with respect to seat pan 50 via lower seat pivot 82. A second end 88 of each drive link 84 includes a follower pin 90 that extend outwardly therefrom and through an elongated guide slot 92 formed in lower mounting brackets 46. Moreover, second end 88 of each drive link 84 is offset outwardly from its first end 86 to provide a clearance between lower seat pivots 82 and lower mounting brackets 46. Thus, in the preferred form, movement coordinating means 52 is disclosed as including a pair of laterally-spaced linkage assemblies having pivotable and sliding linkage members that can be synchronously articulated to cause concurrent and proportional movement of back support 48 (and seatback 24) in response to movement of seat pan 50 (and seat assembly 22).

When it is desired to move integral child seat 16 from its "stowed" position to its "deployed" position, VELCRO fasteners 30B on upper cushion 26 are released from corresponding VELCRO fasteners 30A on backrest 14. Upon release, seat assembly 22 can be freely articulated forwardly toward its lowered deployed position. As such, seat pan 50 is caused to pivot about lower seat pivots 82 which, in turn, causes guide links 76 and drive links 84 to pivot forwardly. In response, follower pins 90 slide upwardly within guide slots 92 for causing forward movement of seat pan 50 relative to lower mounting brackets 46. At the same time, such concurrent forward and pivotable movement of seat pan 50 causes pull links 73 to forcibly swing the lower portion of back support 48 forwardly about upper seatback pivots 58 toward the reclined position wherein back segment 54 of back support 48 is co-planar with lower back segment 62 of seat pan 50. As seen in FIG. 3, engagement of follower 90 with the upper terminal end of guide slot 92 and the connection of back support 48 to seat pan 50 via pull links 73 combine to positively locate seat pan 50 and back support 48 in their respective deployed positions while inhibiting continued forward pivotable movement of seat pan 50 about lower seat pivots 82. Thus once deployed, seatback 24 is maintained at a predetermined reclined angle relative to backrest 14 while bolster seat 36 is maintained in a generally orthogonal orientation relative to seatback 24. Such a relationship provides superior comfort to the child occupant over conventional upright-type child seats.

The above-noted linkage assemblies are also effective to inhibit rearward pivotable movement of the components toward their respective stowed position until it is actually desired to fold integral child seat 16 into backrest 14. At that time, the front edge of upper cushion 26 is raised for causing rearward pivotable movement of seat pan 50 about lower seat pivots 82 for reversing the articulated movements described above. In the stowed position of FIG. 2, it can be seen that both seat pan 50 and back support 48 are swung rearwardly relative to lower mounting brackets 46 with followers 90 engaging the lower terminal ends of guide slots 92. Thus, seat pan 50 and back support 48 are positively located in both of their respective stowed and deployed positions to permit easy use of integral child seat 16. It will also be appreciated that the backside of upper cushion 26 can serve as a mud flap or guard since it extends in front of bolster seat 36. Finally, all linkages except pull links 73 and possibly first ends 86 of drive links 84 are always concealed from view, with such exposed components being upholstered.

As is now readily apparent, one primary feature of the present invention is the ability to deploy child seat 16 with one hand by a simple one motion process. Following release of upper cushion 26, and without changing his/her grasp, the operator simply continues to pull forwardly for pivoting seat assembly 22 into its lowered operative position. As seat assembly 22 is pivoted into its lowered operative position, seatback 24 is automatically articulated into its reclined operative position by movement coordinating means 52. Accordingly, the operator is able to quickly and easily move integral child seat 16 between its "stowed" position and its fully "deployed" position with relative ease from even the most awkward locations.

The foregoing discussion discloses and describes merely exemplary embodiments of the present invention. One skilled in the art will readily recognize from such discussion, and from the accompanying drawings and claims, that various changes, modifications and variations can be made therein without departing from the spirit and scope of the invention as defined in the following claims.

What is claimed is:

1. A child seat adapted to be integrated into a vehicle seat and movable from a stowed position to a deployed position relative to the vehicle seat by reclining a seatback member and lowering a seat member, the improvement comprising interconnection means associated with said seatback member and said seat member for automatically reclining said seatback member in coordination with lowering of said seat member, said interconnection means including a first link and a second link on each lateral side of the child seat has been inserted before "each" and each having a first end with a first pivot and a second end with a second pivot, each of said first pivots and each of said second pivots directly pivotably connected to said seat member and to said seatback member respectively; one of said second pivots on each lateral side being pivotably connected to an upper end of the seatback member.

2. The child seat of claim 1 wherein said seat member includes a first pair of integral bolsters formed on opposite lateral sides thereof, and said seatback member includes a second pair of bolsters formed on opposite lateral sides thereof, and wherein said first and second pairs of bolsters are aligned in common planes such that substantially continuous bolster segments are formed along each lateral edge of said child seat in its deployed position.

3. The child seat of claim 2 further comprising a belt-type harness restraint for releasably restraining an occupant seated within said child seat.

4. A retractable child seat that is movable between a stowed position and a deployed position, comprising:

a seatback member supported for movement between an upright storage position and a reclined operative position;

a seat member supported for movement between a raised storage position and a lowered operative position; and movement coordinating means interconnecting said seatback member to said seat member for automatically moving said seatback member to said reclined position in coordination with movement of said seat member to said lowered position for establishing said deployed child seat position, and for automatically moving said seatback member to said upright storage position in coordination with movement of said seat member to said raised storage position for establishing said stowed child seat position, said movement coordinating means includes a first link and a second link on each lateral side of the child seat has been inserted before "each" and each having a first end with a first pivot and a second end with a second pivot, each of said first pivots and each of said second pivots directly pivotably connected to said seat member and to said seatback member respectively; one of said second pivots on each lateral side being pivotably connected to an upper end of the seatback member.

5. The child seat of claim 4 wherein said seat member includes a first pair of integral bolsters formed on opposite lateral sides thereof, and said seatback member includes a second pair of bolsters formed on opposite lateral sides thereof, and wherein said first and second pairs of bolsters are aligned in common planes such that substantially continuous bolster segments are formed along each lateral edge of said child seat in its deployed position.

6. The child seat of claim 5 further comprising a belt-type harness restraint for releasably restraining an occupant seated within said child seat.

7. A retractable child seat for an automotive vehicle comprising:

a passenger seat having a frame and defining a recess for mounting said retractable child seat to said frame;

a seat member;

a back support member pivotally coupled at its upper end to said frame;

a first link on each lateral side of said child seat, each said first link having a first end and a second end directly pivotably connecting said first end by a first pivot to said seat member and directly pivotably connecting a second end by a second pivot to a lower portion of said back support member;

a second link on each lateral side of said child seat, each said second link having a first end directly pivotably connected to said seat member and a second end directly pivotably connected to said frame by means of a follower disposed for sliding movement within a guide slot formed in said frame; and a third link on each lateral side of said child seat, each said third link having a lower end directly pivotably connected to a portion of said seat member and an upper end directly pivotably connected to said frame and an upper end of said back support member such that as said seat member is pivoted said lower end of said third link is caused to move, whereby said seatback member is caused to pivot between an upright storage position and a reclined operative position in coordination with pivotable movement of said seat member between a raised storage position and a lowered operative position.

8. The retractable child seat of claim 7 wherein said seat member includes a first pair of integral bolster formed on opposite lateral sides thereof, said back support member includes a second pair of bolsters formed on opposite lateral sides thereof, and wherein said first and second pairs of bolsters are aligned in common planes such that substantially continuous bolster segments are formed along each lateral edge of said child seat in its lowered operative position.

9. The retractable child seat of claim 8 further comprising a belt-type harness restraint for releasably restraining an occupant seated within said retractable child seat.

* * * * *

UNITED STATES PATENT AND TRADEMARK OFFICE
CERTIFICATE OF CORRECTION

PATENT NO.    : 5,588,700
DATED         : December 31, 1996
INVENTOR(S)   : Robert I. Homier It is certified that error appears in the above-indentified patent and that said Letters Patent is hereby corrected as shown below:

Column 8, lines 14 - 15, claim 1,
delete "has been inserted before "each" and".

Column 8, lines 52 - 53, claim 4,
delete "has been inserted before "each" and".

Signed and Sealed this

Seventeenth Day of June, 1997

*Attest:*

BRUCE LEHMAN

*Attesting Officer*    *Commissioner of Patents and Trademarks*